US007200921B2

(12) United States Patent
Loibl

(10) Patent No.: US 7,200,921 B2
(45) Date of Patent: Apr. 10, 2007

(54) METHOD OF MANUFACTURING A HEATED WINDSHIELD

(75) Inventor: Joseph M. Loibl, Farmington Hills, MI (US)

(73) Assignee: Automotive Components Holdings, LLC, Dearborn, MI (US)

(*) Notice: Subject to any disclaimer, the term of this patent is extended or adjusted under 35 U.S.C. 154(b) by 245 days.

(21) Appl. No.: 11/051,006

(22) Filed: Feb. 4, 2005

(65) Prior Publication Data
US 2006/0174476 A1 Aug. 10, 2006

(51) Int. Cl.
H05B 3/00 (2006.01)
B60L 1/02 (2006.01)

(52) U.S. Cl. .............. 29/611; 29/620; 29/816; 29/854; 219/203

(58) Field of Classification Search .............. 29/611, 29/854, 816, 620; 439/76.2; 219/203, 522, 219/541
See application file for complete search history.

(56) References Cited

U.S. PATENT DOCUMENTS

| 3,700,542 | A | * | 10/1972 | Davis ............ 428/174 |
| 3,729,616 | A | | 4/1973 | Gruss et al. |
| 3,745,309 | A | | 7/1973 | Gruss |
| 3,772,075 | A | | 11/1973 | Tamopol et al. |
| 3,778,898 | A | | 12/1973 | Gruss et al. |
| 3,928,748 | A | | 12/1975 | Sauer |
| 3,947,618 | A | | 3/1976 | Gruss |
| 4,032,272 | A | * | 6/1977 | Miller ............ 425/12 |
| 4,100,398 | A | | 7/1978 | Levin |
| 4,284,452 | A | | 8/1981 | Bethge et al. |
| 4,321,296 | A | | 3/1982 | Rougier |
| 4,396,826 | A | | 8/1983 | Orcutt et al. |
| 4,436,575 | A | | 3/1984 | Dran et al. |
| 4,543,466 | A | | 9/1985 | Ramus |
| 4,786,784 | A | | 11/1988 | Nikodem et al. |
| 4,918,288 | A | | 4/1990 | Carter et al. |
| 5,099,104 | A | * | 3/1992 | Holzer et al. ....... 219/203 |
| 5,208,444 | A | * | 5/1993 | Winter et al. ....... 219/547 |
| 5,213,828 | A | | 5/1993 | Winter et al. |
| 5,445,694 | A | | 8/1995 | Gillner et al. |
| 5,543,601 | A | * | 8/1996 | Bartrug et al. ....... 219/203 |
| 5,708,251 | A | | 1/1998 | Naveh |
| 5,783,743 | A | | 7/1998 | Weber |
| 5,798,499 | A | | 8/1998 | Shibata et al. |
| 5,886,321 | A | | 3/1999 | Pinchok, Jr. et al. |
| 6,024,904 | A | | 2/2000 | Nanri |
| 6,180,921 | B1 | | 1/2001 | Boaz |
| 6,185,812 | B1 | | 2/2001 | Castle et al. |
| 6,204,480 | B1 | | 3/2001 | Woodard et al. |
| 6,472,636 | B1 | | 10/2002 | Baldwin |
| 6,492,619 | B1 | | 12/2002 | Sol |
| 6,625,875 | B2 | | 9/2003 | Sol |
| 6,765,177 | B2 | | 7/2004 | Noguchi et al. |
| 6,791,065 | B2 | | 9/2004 | Bartrug et al. |

(Continued)

Primary Examiner—A. Dexter Tugbang
Assistant Examiner—Tai Van Nguyen

(57) ABSTRACT

A method of making a windshield having first and second outer layers and a conductive bar, an electrical connector, and an intermediate layer positioned between the outer layers. The method includes the step of sinking the conductive bar and the electrical connector into a surface of the intermediate layer so as to be at least substantially flush with the surface. After sinking the conductive bar and the electrical connector into the surface, the first outer layer is engaged with the surface of the intermediate layer. Additionally, the second outer layer is engaged with a second surface of the intermediate layer.

16 Claims, 4 Drawing Sheets

U.S. PATENT DOCUMENTS

| | | |
|---|---|---|
| 6,791,066 B2 | 9/2004 | Hawk |
| 2003/0019859 A1 | 1/2003 | Sol |
| 2003/0019860 A1 | 1/2003 | Sol |
| 2003/0146199 A1 | 8/2003 | Sol et al. |
| 2003/0150848 A1 | 8/2003 | Noguchi et al. |
| 2004/0016738 A1 | 1/2004 | Bartrug et al. |
| 2004/0016739 A1 | 1/2004 | Hawk |
| 2004/0065651 A1 | 4/2004 | Voeltzel |
| 2004/0159645 A1 | 8/2004 | Gillner et al. |

* cited by examiner

METHOD OF MANUFACTURING A HEATED WINDSHIELD

BACKGROUND

1. Field of the Invention

The invention relates generally to a heated windshield for a motor vehicle. More specifically, the invention relates to the manufacturing of the windshield having an electrical connector.

2. Related Technology

Automotive vehicles typically include a defrosting or defogging mechanism for windshields and/or windows to improve the visibility therethrough during vehicle operation. One such type of mechanism is a heated windshield having a plurality of conductive wires (fine wires) located between a pair of glass panels. This type of windshield is most commonly used as the backlight or a front windshield for a motor vehicle. Heated windshields typically also include a transparent or translucent support layer positioned between the glass panels that supports the fine wires and the respective electrical conductors.

The fine wires are in electrical connection with an electrical power source located within the motor vehicle via conductive components. More specifically, the conductive components include busbars and electrical connector(s). When the vehicle operator so desires, the power source provides an electrical current to the wires, thereby heating the fine wires and defrosting and/or defogging the windshield.

During the currently-known processes of manufacturing fine wire windshields, the conductive components are positioned in desired locations on a surface of the support layer. Next, the front and back glass panels move towards the opposing surfaces of the support layer, sandwiching the support layer and the conductive components. The glass panels and the support layer are compressed together and become bonded with each other by the compression force or by adhesives.

The conductive components become embedded within the support layer by the force of the converging glass panels. During this step, one of the glass panels contacts the conductive components before it contacts the support layer, thus causing air to become trapped between the respective components. The air pockets may degrade the quality of the windshield both structurally and aesthetically.

Therefore, it is desirous to provide for the manufacturing of a fine wire windshield having improved structural and aesthetic quality.

SUMMARY

In one aspect of the present invention, a method of making a windshield is provided, wherein the windshield includes first and second outer layers, a conductive bar, an electrical connector, and an intermediate layer positioned between the outer layers. The electrical connector may include a heat-protective, polyimide-based coating. The method of making the windshield includes the step of sinking the conductive bar and the electrical connector into a surface of the intermediate layer. More specifically, the conductive bar and the electrical connector are positioned substantially flush with or below the surface during this step. After the step of sinking the conductive bar and the electrical connector into the surface, the first outer layer is engaged with a surface of the intermediate layer. Next, the second outer layer is engaged with a second surface of the intermediate layer In an alternative embodiment, the method includes the step of heating the electrical connector to a temperature sufficient to soften the intermediate layer. The step of heating the electrical connector occurs before the step of sinking the conductive bar and the electrical connector into the surface. Alternatively, the step of heating the electrical connector occurs substantially simultaneously with the step of sinking the conductive bar and the electrical connector into the surface. In yet another aspect, the method may include the step of moving a heating element, such as a soldering iron, along a length of the electrical connector.

In another aspect, the method includes the step of substantially removing air from between the first outer layer and the surface and from between the second outer layer and the second surface. Additionally, the method may include the step of applying pressure and a second temperature to the windshield in an amount sufficient to cause air located between the outer layers and the respective surfaces to dissolve into the intermediate layer.

Further objects, features and advantages of this invention will become readily apparent to persons skilled in the art after a review of the following description, with reference to the drawings and claims that are appended to and form a part of this specification.

DETAILED DESCRIPTION

Figure 1:
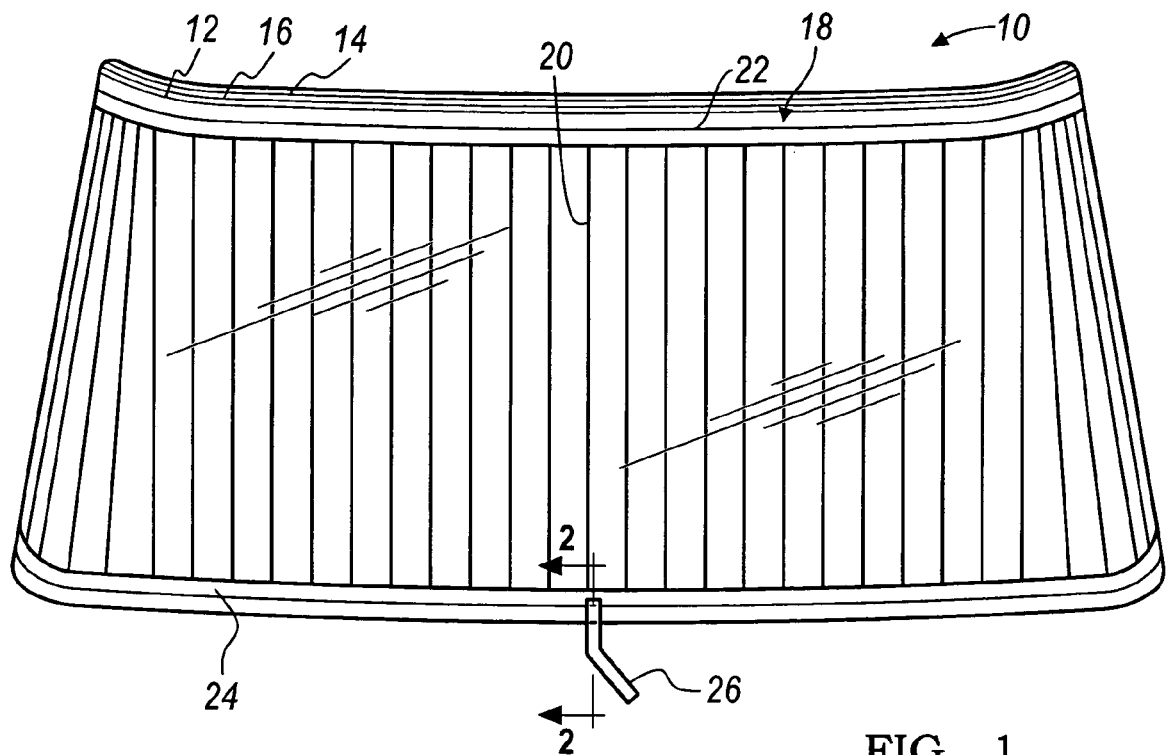
FIG. 1 shows a perspective view of a fine wire windshield for a motor vehicle embodying the principles of the present invention.

Referring now to the drawings, FIG. 1 shows a windshield 10 for a motor vehicle and that may be used in any appropriate configuration, such as the rear windshield. As detailed in FIG. 2 (which should not be interpreted as being drawn to scale) the windshield 10 includes a pair of outer layers or panels 12, 14 and an intermediate layer 16 located there between. More specifically, the outer layers 12, 14 are glass panels and the intermediate layer 16 is a transparent support layer composed of a vinyl or plastic material. Alternatively, any other appropriate translucent or transparent material may be used.

The windshield 10 also includes a defrosting/defogging mechanism 18 that is embedded between the outer panels 12, 14 and that is heated by an electrical current traveling through electrical components of the windshield 10. The defrosting/defogging mechanism 18 includes a plurality of fine wires 20 (of which only a representative number are labeled in the figures for clarity) extending across the windshield 10 in a direction generally parallel to each other. The fine wires 20 in the figures are generally equidistant from each other and extend in a vertical direction, but any appropriate configuration may be used. Further, the fine wires 20 are composed of an electrically conductive material, such as tungsten, but any other appropriate material may be used.

Top and bottom busbars 22, 24 are located adjacent to the top and bottom of the windshield 10, respectively. The fine wires 20 are electrically connected to both of the busbars 22, 24 and extend therebetween in a direction generally perpendicular to the busbars 22, 24. Each of the fine wires 20 is substantially equal in length and diameter such that the electrical current has an equal path of resistance along every fine wire 20, thus evenly heating the windshield 10.

Figure 2:
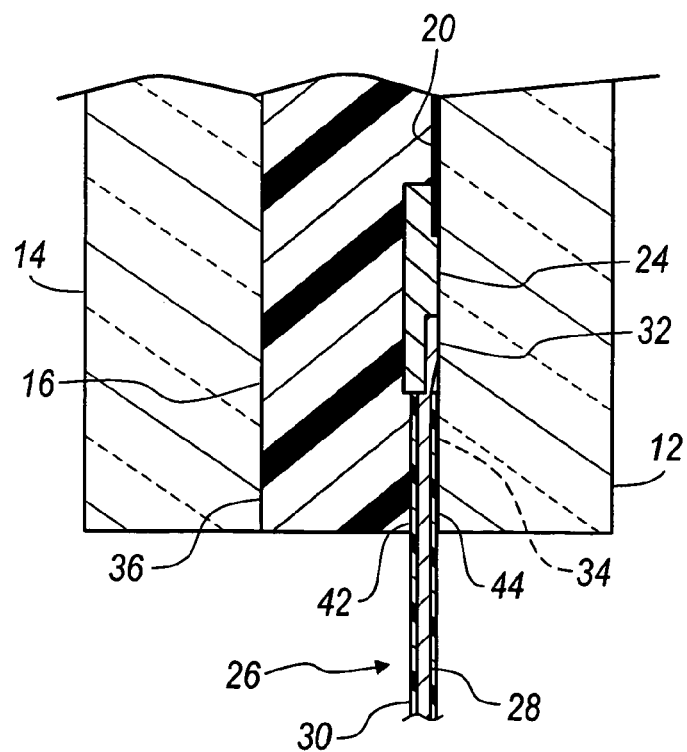
FIG. 2 is an enlarged cross-sectional view taken generally along line 2—2 in FIG. 1 showing the electrical connector in a compressed state and embedded within the busbar.

The busbars 22, 24 and the fine wires 20 are supplied with electricity by a power source (not shown) via an electrical connector 26 extending out of the windshield 10. As shown in FIG. 2, the electrical connector 26 is an electrically-conductive wire 28 covered by a heat-protective, polyimide-based coating 30. The wire 28 can have any cross-sectional shape, such as a circular or an elongated shape. However, the end portion 32 of the wire 28 that contacts the busbar 24 is stripped of the coating 30 so that the respective components 24, 28 are in electrical connection with each other.

The fine wire 20, the busbar 24, and the electrical connector 26 are embedded in the support layer 16 so as to be substantially flush with or located below a first surface 34 of the support layer 16 in the area adjacent to the electrical connector 26. Therefore, both the first surface 34 and an opposing second surface 36 of the support layer 16 engage the glass panels 12, 14 in a generally flush connection, as will be discussed in more detail below.

Alternatively, the windshield may have any appropriate design to the design described above, such as having a single fine wire extending up and down the windshield in a serpentine path. The fine wire in this, or another alternative design, may be connected to a single busbar or it may be directly connected to the power source without the use of a busbar. Furthermore, the busbar 24 may include portions of non-conductivity between some of the wires such that the wires are wired in series. Such a configuration forces the electrical current to travel along each of the fine wires in a serpentine path and causes an evenly-heated windshield 10.

Figure 7:
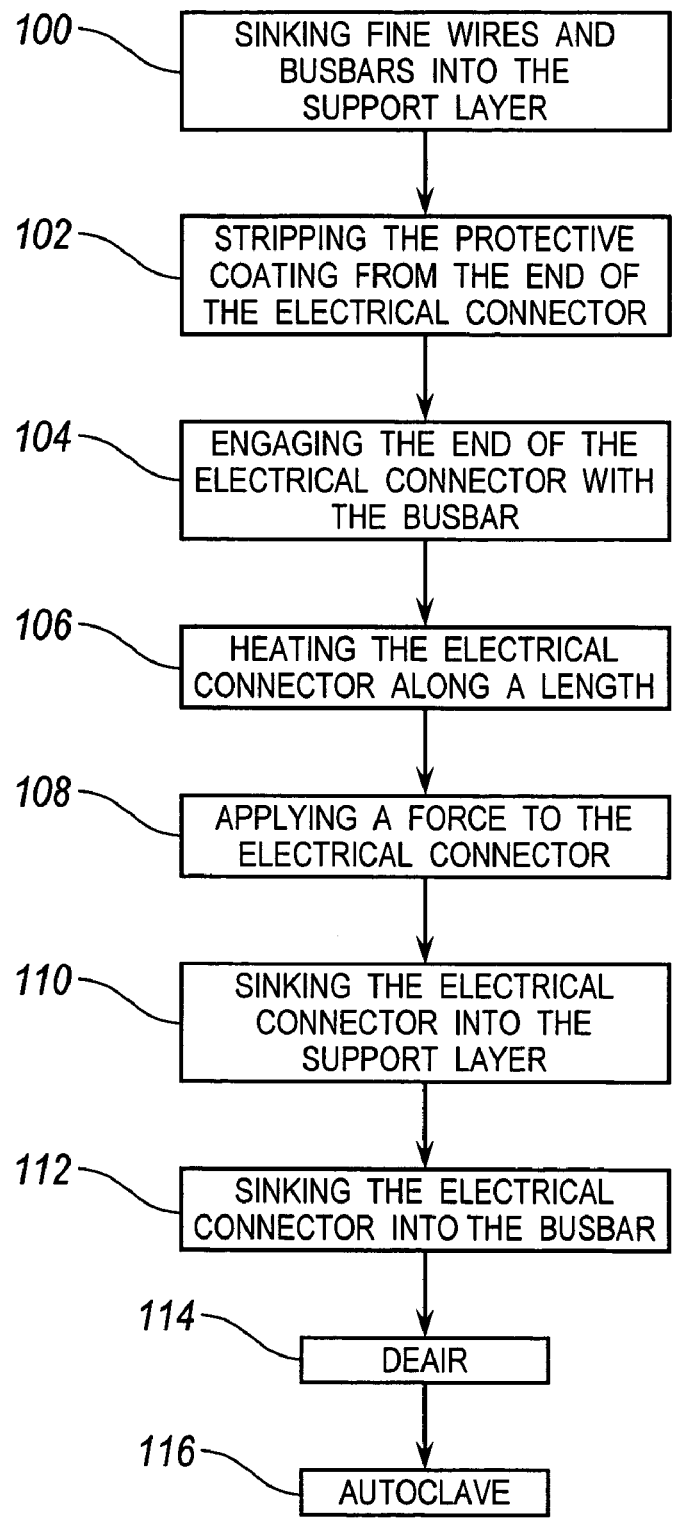
FIG. 7 is a flowchart detailing a method of manufacturing a fine wire windshield embodying the principles of the present invention.

Referring to FIG. 7, a method of manufacturing the windshield 10 will now be discussed.

In step 100 the fine wires 20 and the busbars 22, 24 are sunk into the support layer 16. More specifically, the fine wires 20 and the busbars 22, 24 are connected to an electrical power source and heated to a temperature sufficient to soften the support layer 16. Next, a force is applied to the fine wires 20 and the busbars 22, 24 to sink the components 20, 22, 24 into the support layer 16 such as to be flush with the first surface 34 in the area adjacent to the electrical connector. The force is preferably less than 50 Newtons, and more preferably less than 25 Newtons. Alternatively, the components 20, 22, 24 are heated and allowed to sink naturally, from gravitational forces, into the support layer 16. Alternatively, the busbar includes first and second layers located on opposite sides of the fine wires. The first and second layers thereby sandwich the fine wires and secure them in place.

Figure 3:
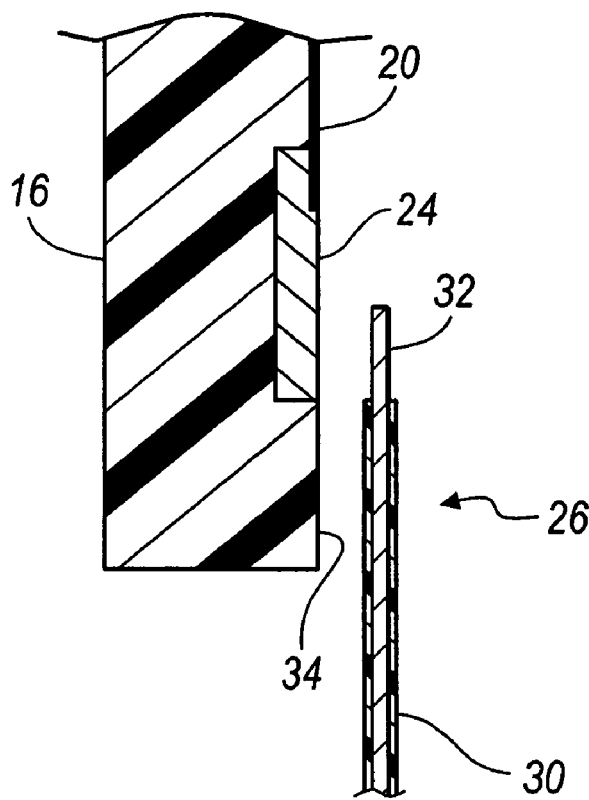
FIG. 3 is cross-sectional view of a partially-assembled support layer, busbar, and electrical connector similar to that shown in FIG. 2.

Next, in step 102, the electrical connector 26 is prepared for connection with the busbar 24 by removing the protective coating 30 from the end portion 32. At this point in the process, the components 16, 26 are in the state shown in FIG. 3.

In step 104, the end portion 32 of the electrical connector 26 is engaged with the busbar 24 and with the first surface 34 of the support layer 16.

Figure 4:
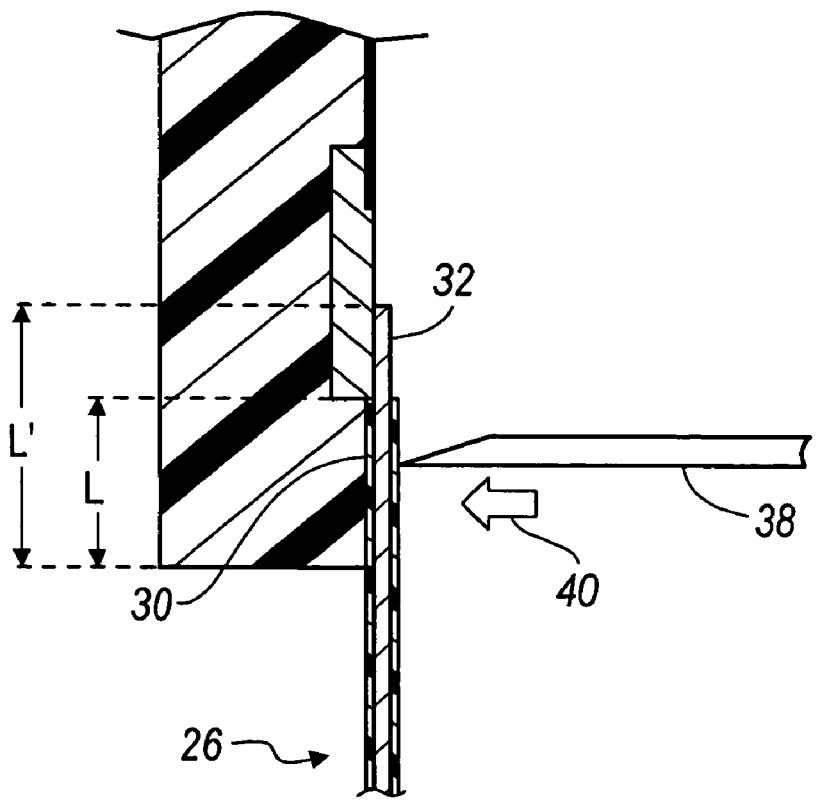
FIG. 4 is cross-sectional view similar to that shown in FIG. 3, including a heating element heating the electrical connector along a length.

Referring to FIGS. 4 and 7, in step 106 the electrical connector 26 is heated along a length L by a heating element, such as a soldering iron 38. More specifically, the soldering iron 38 contacts the electrical connector 26 and moves along the length L of the coating until the electrical connector 26 reaches a temperature required to soften the support layer 16. Alternatively, the electrical connector 26 is heated along a second length L' that includes the end portion 32 and a portion of the connector 26 covered by coating 30. In this alternative step, the end portion 32 is heated to a temperature required to soften the busbar 24.

Next, in step 108 a force is applied to the electrical connector 26 along the length L in a direction 40 generally perpendicular to the first surface 34 of the support layer 26. The force application is substantially simultaneous with or subsequent to the heat application such that the electrical connector 26 is still heated to the temperature described in step 106. Therefore, the force may be applied by or with the soldering iron 38 during the heating step 106. Alternatively, the force may be applied by any appropriate method along any appropriate length, such as the second length L'.

Referring to FIGS. 2 and 7, in step 110 the electrical connector 26 is sunk into the support layer 16 such that the electrical connector 26 does not extend beyond the surface 34. More specifically, an inboard side 42 of the electrical connector 26 is embedded in the support layer such that an outboard side 44 of the electrical connector 26 is substantially flush with, or located below, the surface 34 in the area adjacent to the electrical connector. As a result of this configuration, air pockets between the support layer 16 and the glass panels 12, 14 are minimized, as will be discussed in more detail below. As detailed in the above discussion of steps 106 and 108, step 110 may occur naturally or a force may be applied to the electrical connector 26 in order to embed the connector 26.

At step 112 the end portion 32 of the electrical connector 26 is sunk into the busbar 24 such that the end portion 32 is substantially flush with, or located below, the surface 34 of the support layer 16 that is adjacent to the electrical connector 16. Because the busbar 24 is composed of metal and has a higher melting temperature than the support layer 16, the end portion 32 may need to be heated to a temperature higher than that of the electrical connector 26 that directly contacts the support layer 16. Additionally, the force applied to the end portion 32 may need to be higher than the force applied to the portion of the electrical connector 26 that directly contacts the support layer 16.

Figure 5:
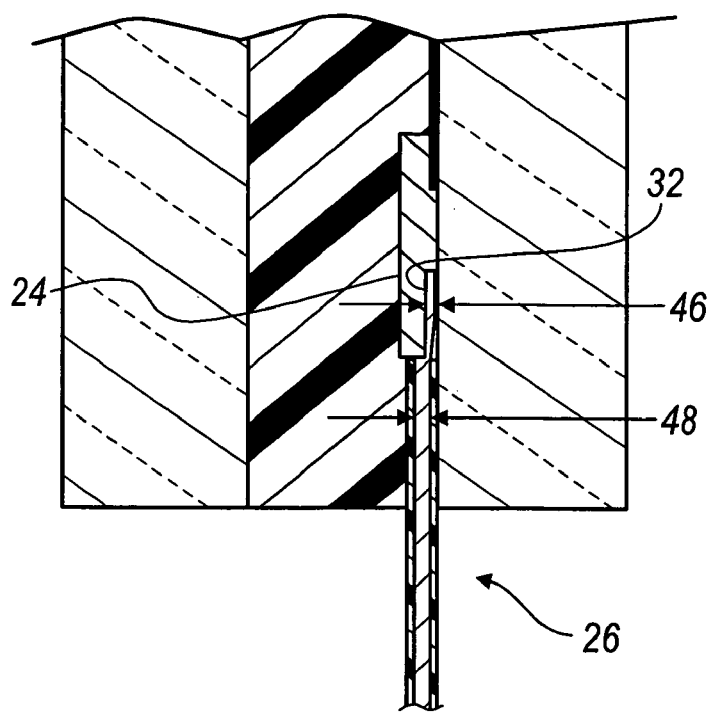
FIG. 5 is a cross-sectional view of an alternative embodiment of the present invention, wherein the busbar is in a compressed state.

Alternatively, as shown in FIG. 5, during step 112 the end portion 32 of the electrical connector 26 may be compressed to an end thickness 46 less than that of the uncompressed thickness 48. More specifically, the electrical connector 16 may expand laterally across the surface of the busbar 24, thus reducing the end thickness 46 and causing the end portion 32 to be flush with the surface 34 of the support layer 16 that is adjacent to the electrical connector 16. In this design, the electrical connector 16 may be composed of woven metal fibers that are able to laterally expand with a minimal applied force.

Figure 6:
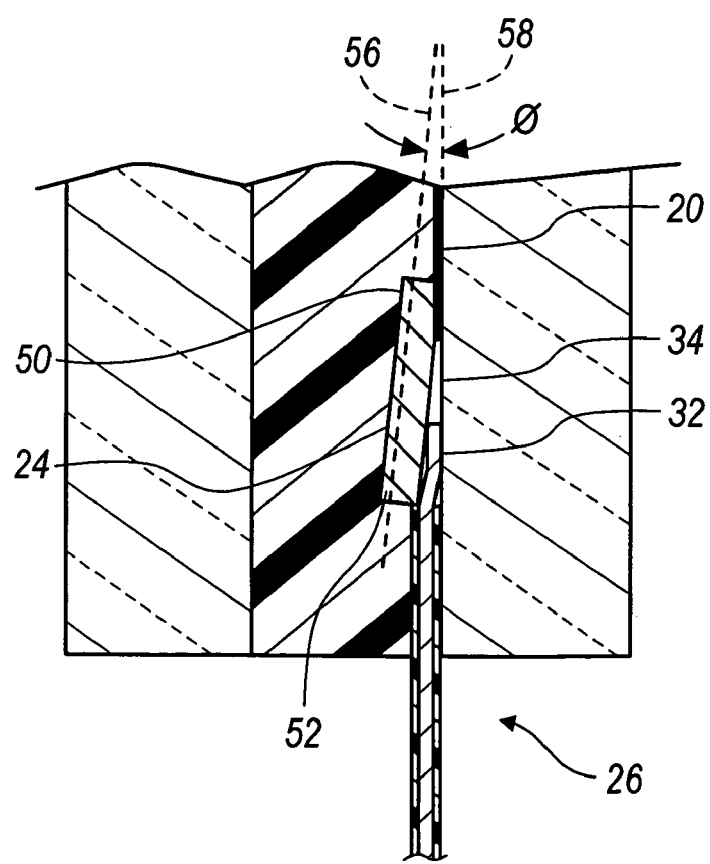
FIG. 6 is a cross-sectional view of yet another alternative embodiment of the present invention, wherein the busbar is displaced.

In yet another alternative design, shown in FIG. 6, the busbar 24 is displaced into the support layer 16 by the electrical connector 26 and/or the fine wires 20. The support layer 16 in this embodiment has a lower compression strength than the busbar 24, the electrical connector 26, and the fine wires 20. Therefore, the force applied to the electrical connector 26 may cause the busbar 24 to be displaced into the support layer 16. More specifically, a top portion 50 of the busbar 24 is displaced a distance generally equal to the thickness of the fine wire and a bottom portion 52 of the busbar 24 is displaced a distance generally equal to the thickness of the end portion 32 of the electrical connector 26. As a result of the different thicknesses of the respective components 32, 52, the busbar 24 is displaced at an angle φ. More specifically, an axis 56 parallel to the surface of the busbar 24 defines the angle φ with an axis 58 parallel to the surface 34 of the support layer.

Next, the outer panels 12, 14 sandwich the support layer such that the first outer panel 12 moves towards and engages the first surface 34 of the support layer 16 and the second outer panel 14 moves towards and engages the first side 34 of the support layer 16. More specifically, the first outer panel 12 contacts the first surface of the support layer 16 in a flush connection to minimize air pockets formed between the respective components 12, 16.

After the outer panels 12, 14 have engaged the support layer, air trapped between the respective layers 12, 14, 16 is substantially removed by a deair step 114 commonly known in the art. Although the deair step 114 reduces air pockets between the respective layers 12, 14, 16, the step 114 cannot remove air pockets that are greater than a particular volume. Therefore, it is beneficial to minimize the air pockets, via the above method, before the deair step 114.

Next, during step 116, the windshield 10 undergoes an autoclave step 116 that substantially dissolves remaining air pockets into the support layer 16. More specifically, during step 116 the windshield 10 is exposed to relatively high temperatures, such as between 250°–350° Fahrenheit, and high pressures, such as twelve (12) bar, to dissolve the air pocket. However, similarly to the deair step 114, the autoclave step 116 may not be able to completely remove air pockets that exceed a particular volume. Therefore, it is beneficial to minimize the air pockets before the autoclave step 116 as described above.

It is therefore intended that the foregoing detailed description be regarded as illustrative rather than limiting, and that it be understood that it is the following claims, including all equivalents, that are intended to define the spirit and scope of this invention.

What is claimed is:

1. A method of making a windshield having first and second outer layers and a conductive bar, an electrical connector, and an intermediate layer positioned between the first and second outer layers, the method comprising:
   heating the electrical connector to a temperature sufficient to soften the intermediate layer;
   sinking the conductive bar and the electrical connector into a surface of the intermediate layer such that the conductive bar and the electrical connector are positioned at least substantially flush with the surface;
   substantially removing air located between the first outer layer and the surface and between the second outer layer and a second surface;
   applying a pressure and a second temperature to the windshield sufficient to cause air located between the first outer layer and the surface and between the second outer layer and the second surface to dissolve into the intermediate layer;
   engaging the first outer layer with the surface and the intermediate layer after the step of sinking the conductive bar and the electrical connector into the surface; and
   engaging the second outer layer with the second surface of the intermediate layer.

2. A method as in claim 1, wherein the temperature is greater than 250 degrees Fahrenheit.

3. A method as in claim 2, wherein the temperature is less than 350 degrees Fahrenheit.

4. A method as in claim 1, wherein the step of heating the electrical connector occurs before the step of sinking the conductive bar and the electrical connector into the surface.

5. A method as in claim 1, wherein the step of heating the electrical connector occurs substantially simultaneously with the step of sinking the conductive bar and the electrical connector into the surface.

6. A method as in claim 5, further comprising the step of moving a heating element along a length of the electrical connector.

7. A method as in claim 6, wherein the heating element is a soldering iron.

8. A method as in claim 1, wherein the electrical connector includes a heat-protective coating.

9. A method as in claim 8, wherein the heat-protective coating includes polyimide.

10. A method as in claim 1, wherein the windshield further includes a second conductive bar and a conductive wire, the method further comprising:
   sinking the second conductive bar into the surface of the intermediate layer such that the second conductive bar is at least substantially flush with the surface; and
   engaging the conductive wire with the conductive bar and the second conductive bar such that the conductive wire extends there between.

11. A method of making a windshield having first and second outer layers and a conductive bar, an electrical connector, and an intermediate layer positioned between the first and second outer layers, the method comprising:
   heating the electrical connector to a temperature sufficient to soften the intermediate layer;
   applying a force to the electrical connector with a component other than the first outer layer;
   sinking the conductive bar and the electrical connector into a surface of the intermediate layer;
   engaging the first outer layer with the surface the intermediate layer after the step of sinking the conductive bar and the electrical connector into the surface and after the step of heating the electrical connector; and
   engaging the second outer layer with a second surface of the intermediate layer.

12. A method as in claim 11, wherein the step substantially of applying the force to the electrical connector occurs substantially simultaneously with the step of sinking the conductive bar and the electrical connector into the surface.

13. A method as in claim 12, further comprising the step of sinking the conductive bar and the electrical connector into the surface of the intermediate layer such that the conductive bar and the electrical connector are positioned substantially with or below the surface.

14. A method as in claim 13, the windshield further including a second conductive bar and a conductive wire, the method further comprising:

sinking the second conductive bar into the surface of the intermediate layer such that the second conductive bar is positioned substantially flush with or below the surface; and engaging the conductive wire with the conductive bar and the second conductive bar such that the conductive wire extends there between.

15. A method as in claim 14, wherein the force is less than 50 Newtons.

16. A method as in claim 15, wherein the force is less than 25 Newtons.

\* \* \* \* \*